(12) United States Patent
Amann

(10) Patent No.: US 10,704,713 B2
(45) Date of Patent: Jul. 7, 2020

(54) CONNECTING DEVICE AND COMPONENT GROUP

(71) Applicant: ElringKlinger AG, Dettingen (DE)

(72) Inventor: Erich Amann, Rottenburg (DE)

(73) Assignee: ElringKlinger AG, Dettingen (DE)

( * ) Notice: Subject to any disclaimer, the term of this patent is extended or adjusted under 35 U.S.C. 154(b) by 849 days.

(21) Appl. No.: 14/863,940

(22) Filed: Sep. 24, 2015

(65) Prior Publication Data

US 2016/0090954 A1 Mar. 31, 2016

(30) Foreign Application Priority Data

Sep. 30, 2014 (DE) .......................... 10 2014 114 227

(51) Int. Cl.
*F16L 21/02* (2006.01)
*F02M 35/10* (2006.01)
*F02M 35/112* (2006.01)

(52) U.S. Cl.
CPC ....... *F16L 21/02* (2013.01); *F02M 35/10078* (2013.01); *F02M 35/10295* (2013.01); *F02M 35/112* (2013.01)

(58) Field of Classification Search
CPC .............. F16L 21/02; F02M 35/10078; F02M 35/10295
USPC ......... 285/124.4, 124.3–124.5, 139.1–139.3, 285/140.1, 201–212, 214
See application file for complete search history.

(56) References Cited

U.S. PATENT DOCUMENTS

| | | | | |
|---|---|---|---|---|
| 935,984 A | * | 10/1909 | Hinck | F16L 19/0218 285/208 |
| 1,529,929 A | * | 3/1925 | Schwartz | B65D 39/084 285/204 |
| 2,450,173 A | * | 9/1948 | Uhri | B65D 39/082 220/288 |
| 3,415,549 A | * | 12/1968 | Chatham | F16C 1/262 403/197 |
| 3,602,480 A | * | 8/1971 | Demi | F16L 41/12 251/146 |
| 4,513,172 A | * | 4/1985 | Matsui | H02G 15/04 174/653 |
| 5,970,939 A | * | 10/1999 | Motosugi | F02M 35/10144 123/184.21 |

(Continued)

FOREIGN PATENT DOCUMENTS

DE 10 2005 007 245 5/2006

*Primary Examiner* — Anna M Momper
*Assistant Examiner* — Fannie C Kee
(74) *Attorney, Agent, or Firm* — Womble Bond Dickinson (US) LLP

(57) ABSTRACT

In order to provide a connecting device for connecting two components which enables two components to be connected, it is proposed that the connecting device include the following: a decoupling element; a sleeve for accommodating and guiding a connecting element, wherein the sleeve includes a base body which includes the following: a hollow cylindrical guidance section in which a connecting element is guidable; an axially limiting section which projects outwardly away from the guidance section in a radial direction; a radially outward limiting section which adjoins the axially limiting section and which together with the guidance section and the axially limiting section forms an annular seating section for accommodating the decoupling element.

15 Claims, 8 Drawing Sheets

(56) References Cited

U.S. PATENT DOCUMENTS

| | | | | |
|---|---|---|---|---|
| 6,142,539 A | * | 11/2000 | Redemann | C23C 16/44 277/630 |
| 7,048,265 B2 | * | 5/2006 | Huprikar | F16F 1/3732 267/141.1 |
| 2002/0131840 A1 | | 9/2002 | Szczukowski et al. | |

* cited by examiner

CONNECTING DEVICE AND COMPONENT GROUP

CROSS-REFERENCE TO RELATED APPLICATIONS

This application claims the benefit of German application No. 10 2014 114 227.6, filed on Sep. 30, 2014, which is incorporated herein by reference in its entirety and for all purposes.

FIELD OF DISCLOSURE

The present invention relates to a connecting device for connecting two components. Such a connecting device can be used in particular in the field of engines for motor vehicles.

SUMMARY OF THE INVENTION

The object of the present invention is to provide a connecting device which enables two components to be connected in a reliable and noise-reducing manner.

In accordance with the invention, this object is achieved in that the connecting device for connecting two components comprises the following:

a decoupling element;

a sleeve for accommodating and guiding a connecting element, wherein the sleeve comprises a base body which comprises the following:

a hollow cylindrical guidance section in which a connecting element is guidable;

an axially limiting section which projects outwardly away from the guidance section in a radial direction;

a radially outward limiting section which adjoins the axially limiting section and which, together with the guidance section and the axially limiting section, forms an annular seating section for accommodating the decoupling element.

Due to the use of a coupling element and the special form of the sleeve in accordance with the invention, there can preferably be provided a connecting device which enables two components to be connected in a reliable and noise-reducing manner.

In one embodiment of the invention, provision may be made for the radially outward limiting section to run at least approximately parallel to the guidance section.

The radially outward limiting section is preferably substantially in the form of a hollow cylinder.

Preferably, the hollow cylindrical guidance section is in the form of a hollow circular cylinder.

Furthermore, provision may be made for the axially limiting section to be at least approximately in the form of an annular disc.

The seating section for the decoupling element is preferably arranged at one end of the sleeve with respect to an axial direction.

Furthermore, provision may be made for the sleeve to comprise a sleeve foot which is formed by an annular protuberance projecting outwardly away from the guidance section in the radial direction.

The sleeve foot is preferably circular.

Provision may be made for the seating section for accommodating the decoupling element on the one hand and the sleeve foot on the other to be arranged at mutually opposite ends of the sleeve with respect to an axial direction.

The decoupling element is preferably in the form of an annular resilient element.

For example, the decoupling element can be in the form of a rubber ring.

It can be advantageous if the decoupling element comprises a centering protuberance and in particular a centering protuberance in the form of a circular ring.

In the assembled state of the connecting device, the centering protuberance of the decoupling element preferably projects into a seating opening for accommodating the sleeve of the connecting device.

A base section of the decoupling element from which the centering protuberance projects away in a substantially axial direction is preferably located on an outer surface of one component and also on the sleeve, in particular, on the hollow cylindrical guidance section, the axially limiting section and/or the radially outward limiting section in the assembled state of the connecting device.

It can be advantageous for the sleeve and in particular the base body of the sleeve to comprise a metallic material or to be formed of a metallic material.

For example, provision may be made for the metallic material to be a steel material.

The connecting device preferably comprises a gasket element which comprises in particular one or more flow openings.

In the assembled state of the connecting device, the flow openings are preferably configured to pass a fluid therethrough.

As an alternative or in addition thereto, provision may be made for the connecting device to comprise a gasket element which is moveable into engagement with the sleeve foot.

In particular, provision may be made for the connecting device to comprise a gasket element which is moveable into engagement with the sleeve foot in positively-locking, latching and/or inter-engaging manner.

The gasket element preferably comprises a latching section with which the gasket element is moveable into engagement with the sleeve foot.

For example, the latching section may comprise a lead-in chamfer by means of which the sleeve foot is guidable past the latching section in order to engage behind it.

The seating section for accommodating the decoupling element is preferably a single or multiple off-set of the hollow cylindrical guidance section of the sleeve.

Preferably, a decoupling element is arrangeable or arranged to be accommodated by means of the seating section.

The connecting device in accordance with the invention is particularly suitable for use in a component group.

Consequently, the present invention also relates to a component group which comprises two components and one or more connecting devices in accordance with the invention for connecting the components to one another.

The component group in accordance with the invention preferably comprises individual ones or a plurality of the features and/or advantages described in connection with the connecting device in accordance with the invention.

It can be expedient for one of the components to comprise a seating opening for accommodating the sleeve.

The seating opening preferably has an assembly side and a gasket side, wherein the assembly side is a side from which the sleeve is insertable into the seating opening, and wherein the gasket side is a side on which a gasket element of the connecting device is arranged for sealing between the components.

Preferably one of the components comprises a plurality of such seating openings for accommodating a plurality of sleeves of one or more connecting devices.

An inner diameter of the seating opening preferably corresponds at least approximately to an outer diameter of a sleeve foot of the sleeve or is larger than an outer diameter of a sleeve foot of the sleeve.

Furthermore, provision may be made for an inner diameter of the seating opening to be smaller than an outer diameter of the axially and/or radially outward limiting section of the sleeve.

The seating opening is preferably completely cylindrical on the assembly side thereof.

Preferably, the assembly side of the seating opening adjoins an outer surface of the component substantially perpendicularly without a transition section.

An inner surface of the seating opening and an outer surface of the component surrounding the seating opening preferably include an angle of at least approximately 90°.

The substantially cylindrical inner wall of the seating opening preferably directly adjoins the substantially flat outer surface of the component. A groove and/or a chamfer are preferably not provided on the assembly side of the seating opening.

By contrast, provision may be made for a groove and/or a chamfer on the gasket side of the seating opening.

In particular, provision may be made for the gasket side of the seating opening to comprise an annular groove in which, in the assembled state of the component group, a latching section of the gasket element is arranged for latching it to the sleeve foot.

The component group preferably comprises one or more flow channels which enable fluid to flow from one component into the other component.

For the purposes of sealing the one or more flow channels of the component group with respect to the surroundings, there is preferably provided a gasket element of the connecting device which preferably surrounds the one or more flow channels in substantially annular fashion.

The gasket element is preferably formed in one-piece.

Preferably, the gasket element is fixable in positively-locking manner to one of the components by means of one or more sleeves of one or more connecting devices.

In particular, provision may be made for the gasket element to be fixable to one of the components using the sleeve and possibly together with the decoupling element, but not with further components of the connecting device.

Consequently, the gasket element and the one or more sleeves of the one or more connecting devices are preferably pre-mountable on one of the components.

Preferably thereafter, it only remains to apply the further component and then bolt it through the one or more sleeves.

The component group preferably comprises one or more components of an internal combustion engine of a motor vehicle.

In particular, provision may be made for the component group to be a constituent of an internal combustion engine of a motor vehicle.

The component group preferably comprises a component which is in the form of an inlet manifold of an internal combustion engine, and in particular, of a naturally aspirated engine.

Preferably the component in the form of an inlet manifold comprises one or more seating openings for one or more sleeves of one or more connecting devices.

Furthermore, the component in the form of an inlet manifold preferably comprises an air inlet in which a throttle valve device is arranged or is arrangeable for example.

The further component with which the component in the form of an inlet manifold is connectable is preferably a cylinder head of the internal combustion engine.

The gasket element of the connecting device thus serves in particular for sealing between the inlet manifold and the cylinder head.

Preferably, only a single gasket element is provided, this being arrangeable on one of the components and in particular on the inlet manifold by means of a plurality of sleeves.

The gasket element preferably comprises a plurality of fixing openings which are preferably each surrounded by a latching section and/or serve for connecting the gasket element to a respective sleeve.

Thus, in one embodiment of the invention, the entire connecting device comprises just a single connecting element and a plurality of sleeves and a plurality of decoupling elements.

Further preferred features and/or advantages of the invention form the subject matter of the following description and the graphical illustration of an exemplary embodiment.

BRIEF DESCRIPTION OF THE DRAWINGS

Similar or functionally equivalent elements are provided with the same reference symbols in all the Figures.

DETAILED DESCRIPTION OF THE DRAWINGS

Figure 1:
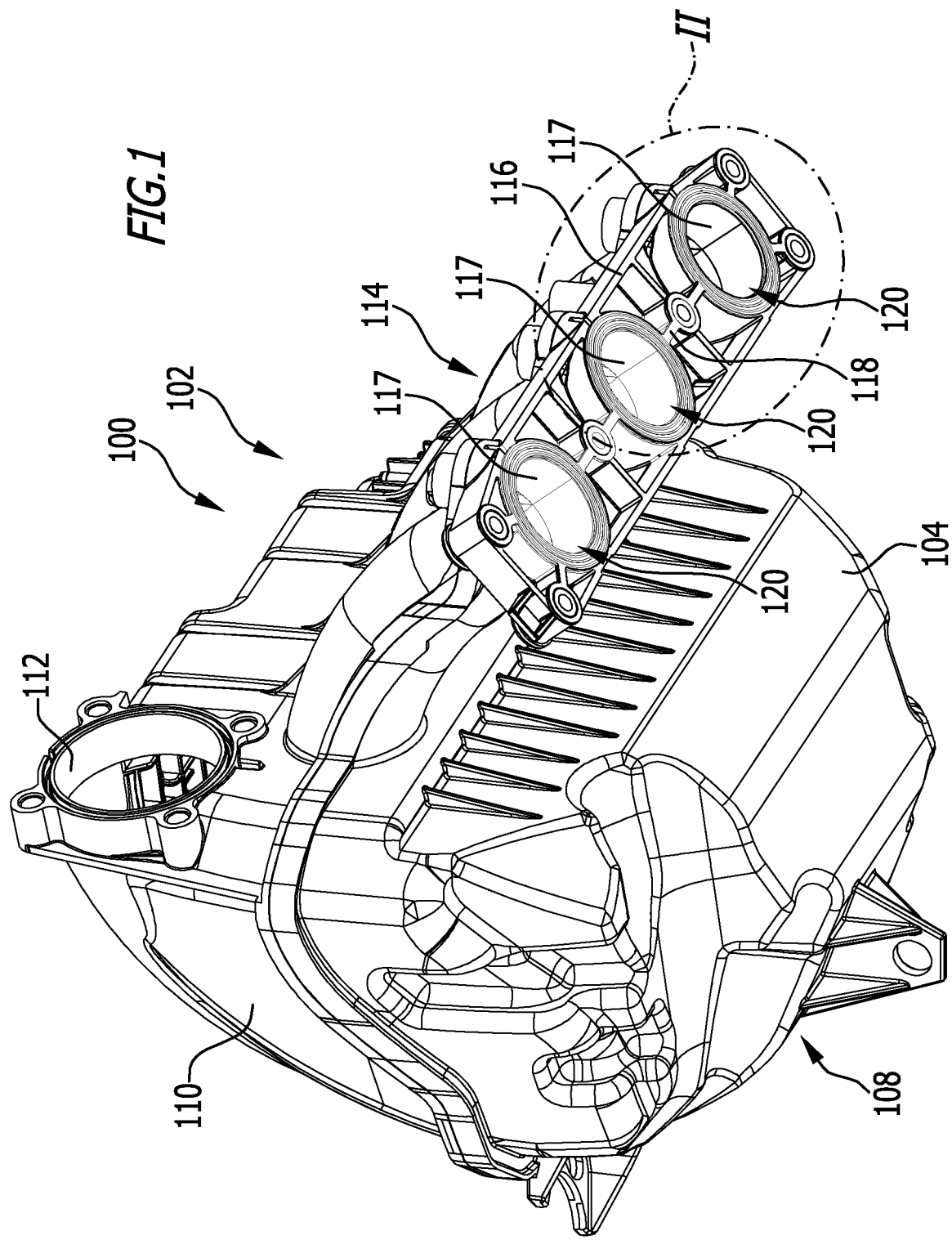
FIG. 1 shows a schematic perspective illustration of one component of a component group in the form of an inlet manifold and also a connecting device for connecting this component to a further component of the component group in the form of a cylinder head for example.
Figure 2:
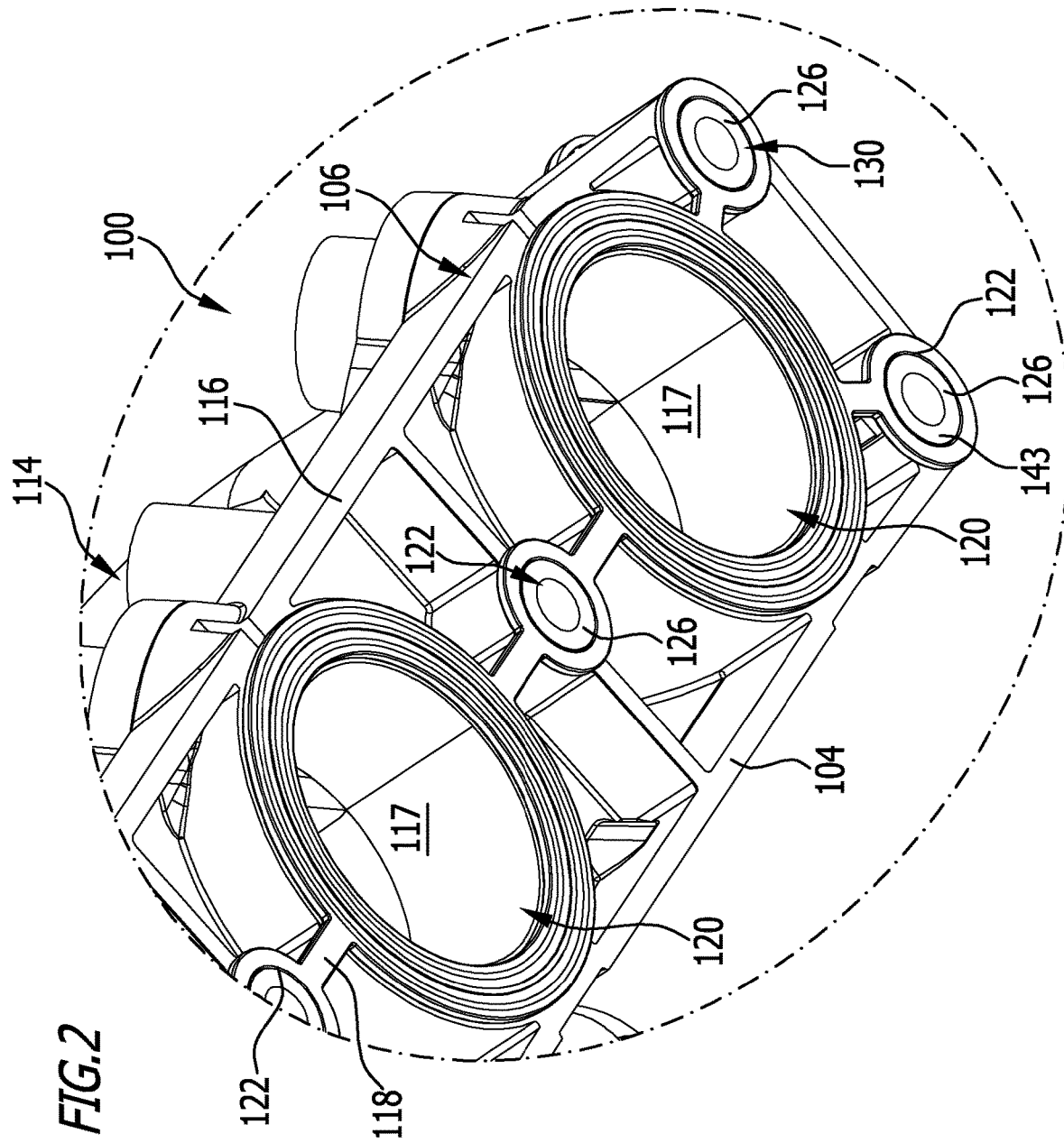
FIG. 2 an enlarged illustration of the region II in FIG. 1.
Figure 3:
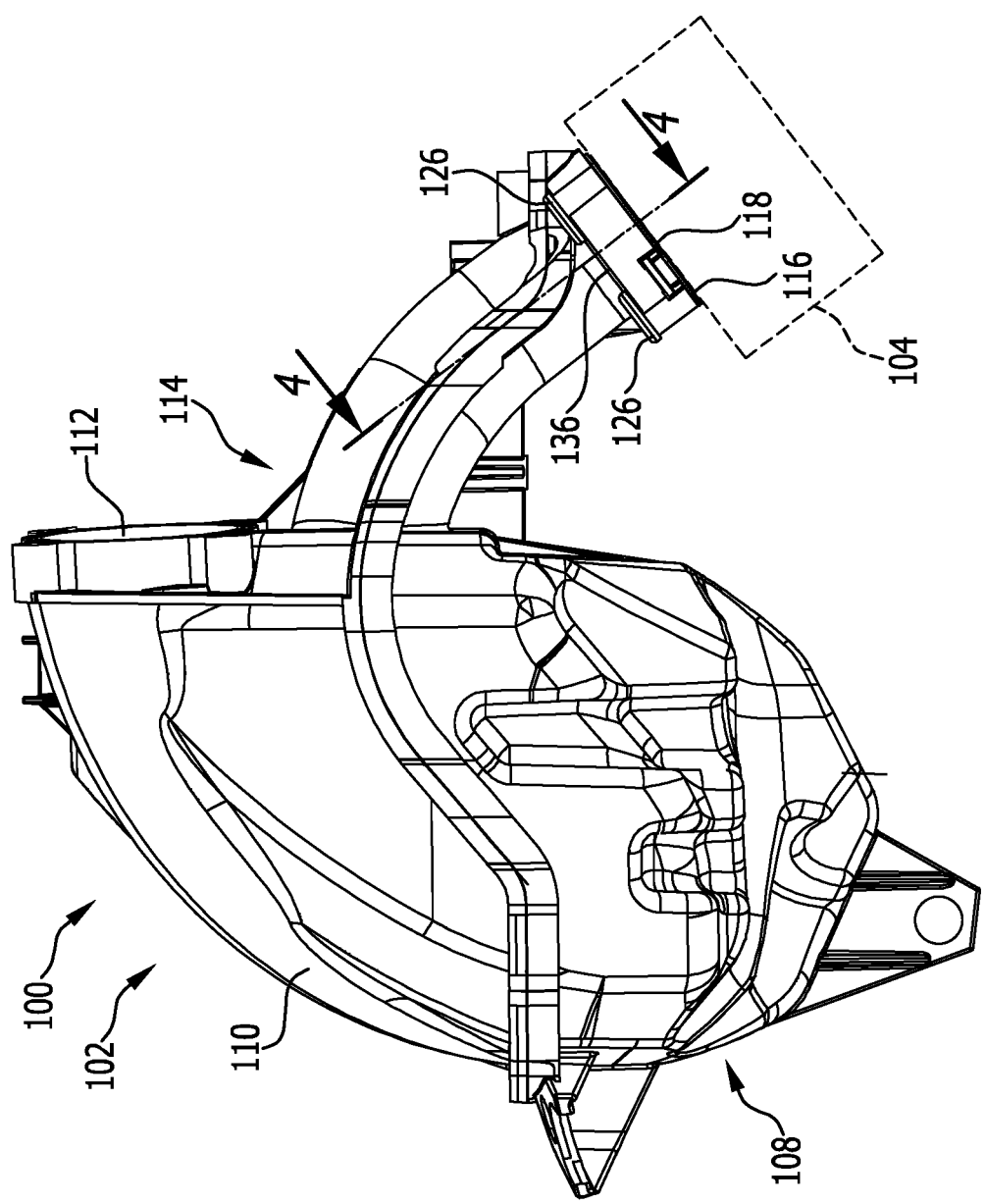
FIG. 3 a schematic side view of the component depicted in FIG. 1.
Figure 4:
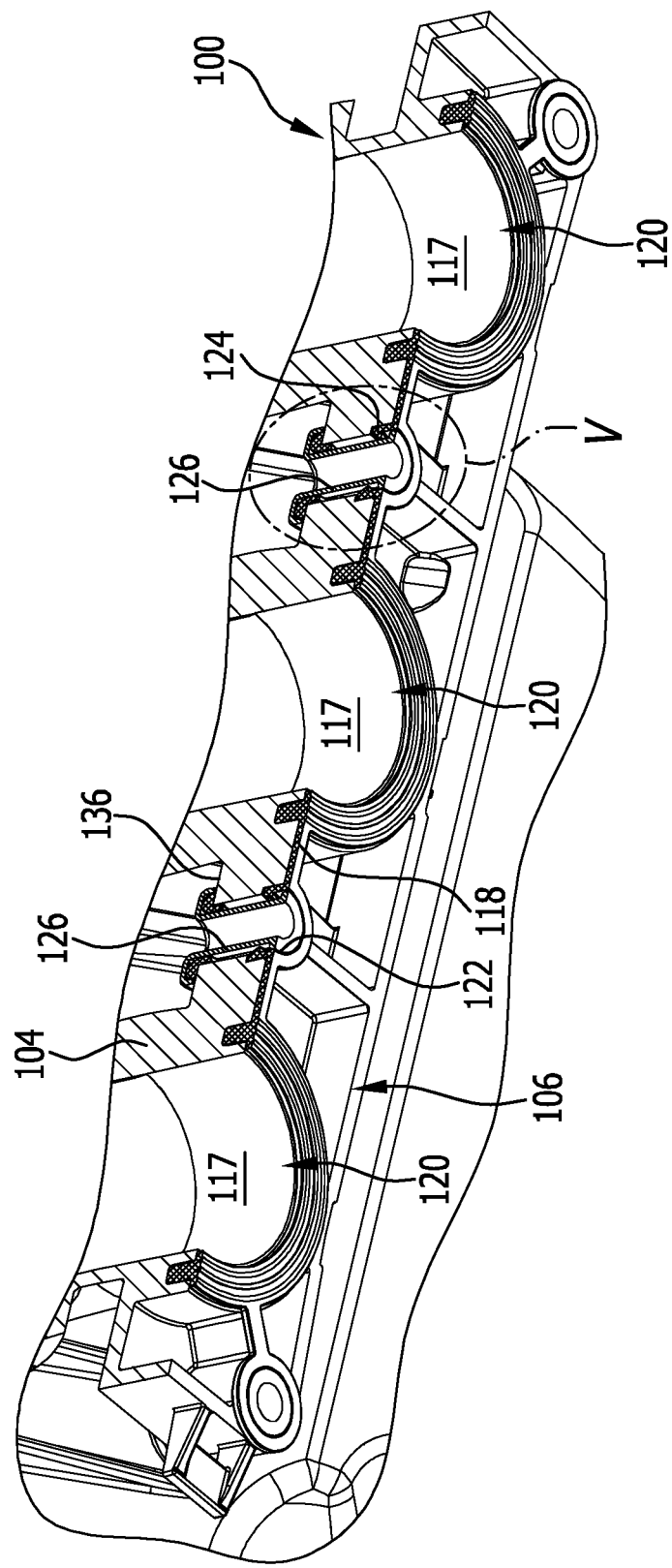
FIG. 4 a perspective partly sectional view of an outlet section of the component and of the connecting device depicted in FIG. 1 that is arranged thereon, along the line 4-4 in FIG. 3.

A component group bearing the general reference 100 that is partly illustrated in FIGS. 1 to 8 is a component of an internal combustion engine 102 of a motor vehicle for example.

In particular, the internal combustion engine 102 is a naturally aspirated engine, i.e., a non-turbocharged internal combustion engine 102.

The component group 100 comprises two components 104 which are connected or connectable to one another by means of a connecting device 106 of the component group 100.

Only one of the components 104 is illustrated in FIGS. 1 to 8.

This component 104 is in the form of an inlet manifold 108.

The further component of the component group 100 is, for example, a cylinder head of the internal combustion engine 102.

The inlet manifold 108 comprises a collector 110 for accommodating the sucked in air.

In particular, this air is supplied through an air inlet 112 which is connected to a (not illustrated) throttle valve device for example.

Furthermore, the inlet manifold 108 comprises an outlet section 114 which, in particular, comprises a plurality of flow channels 117.

The flow channels 117 serve, in particular, for supplying air to the cylinders of the internal combustion engine 102.

The outlet section 114 is preferably fixable directly to the cylinder head of the internal combustion engine 102.

The outlet section 114 thus preferably forms a connector section 116 of the component 104 in the form of an inlet manifold 108 for fixing it to the further component 104 which is in the form of a cylinder head for example.

As can be derived in particular from FIGS. 2 and 4 to 8, the connecting device 106 for connecting the components 104 to one another comprises a one-piece gasket element 118 which is formed in particular from a resilient material such as a rubber material or a plastic material for example.

The gasket element 118 comprises a plurality of flow openings 120 and also a plurality of fixing openings 122.

In connection therewith, the flow openings 120 are formed in such a way that, in the installed state of the component group 100, the gasket element 118 surrounds the flow channels 117 in a substantially annular fashion and seals them externally in the intermediary area between the two components 104.

The fixing openings 122 in the gasket element 118 are formed in such a way as to enable bolts in particular to pass through the gasket element 118 in order to fix the components 104 together.

Each fixing opening 122 is preferably surrounded by a respective latching section 124 of the gasket element 118.

The latching sections 124 serve in particular for connecting the gasket element 118 to sleeves 126 of the connecting device 106 which are yet to be described.

A plurality of seating openings 128 are provided in the component 104 for the purposes of assembling the connecting device 106 and in particular for fixing the gasket element 118 to the component 104 in the form of an inlet manifold 108.

The seating openings 128 are substantially cylindrical and comprise a gasket side 130 which borders on the gasket element 118 of the connecting device 106 in the assembled state of the component group 100. Furthermore, the seating openings 128 comprise an assembly side 132 from where the sleeves 126 of the connecting device 106 are insertable into the seating openings 128.

The construction of an individual seating opening 128 and the associated components of the connecting device 106 will be discussed in greater detail hereinafter.

The other seating openings 128 and also the other components of the connecting device 106 associated therewith are preferably formed in a substantially identical manner.

The seating opening 128 preferably comprises a cylindrical inner wall 134 which, at the assembly side 132, directly adjoins an outer surface 136 of the component 104 which surrounds the seating opening 128.

On the gasket side 130 of the seating opening 128, there is preferably provided a groove 138 in the inner wall 134 so that an inner diameter I of the seating opening 128 is greater on the gasket side 130 of the seating opening 128 than it is on the assembly side 132.

The groove 138 serves, in particular, for accommodating the latching section 124 of the gasket element 118.

The diameter of the seating opening 128, and in particular the inner diameter I extending from the assembly side 132 of the seating opening 128 up to the groove 138 on the gasket side 130, is preferably selected in such a way that a sleeve 126 of the connecting device 106 is insertable into the seating opening 128 from the assembly side 132.

The sleeve 126 has a base body 140 which incorporates a guidance section 142 that is substantially in the form of a hollow cylinder.

Furthermore the base body 140 comprises a sleeve foot 143 which is substantially in the form of an annular protuberance 144.

In connection therewith, the protuberance 144 projects away from the guidance section 142 of the base body 140 in a radial direction 146.

The sleeve foot 143 is thereby arranged at one end 148 of the guidance section 142.

At the other end 150 of the guidance section 142 opposite this end 148, there is provided an axially limiting section 152 of the base body 140.

The axially limiting section 152 adjoins the guidance section 142 and projects outwardly away from the guidance section 142 in the radial direction 146.

The axially limiting section 152 is in the form of an annular disc for example.

At an outer edge region thereof in the radial direction 146, this axially limiting section 152 adjoins a radially outward limiting section 154.

Here, the radially outward limiting section 154 is substantially in the form of a hollow cylinder and runs substantially parallel to the guidance section 142.

In particular, the guidance section 142, the axially limiting section 152 and the radially outward limiting section 154 are constructed in such a way that they form a seating section 156 of the sleeve 126.

The seating section 156 thereby has a substantially C-shaped cross section.

The sleeve 126 is preferably formed in one-piece manner and consists of a steel material for example.

Preferably, the entire sleeve 126 is substantially rotationally symmetrical about a rotational axis 158.

The radial direction 146 on the one hand and an axial direction 160 on the other are defined with respect to this rotational axis 158.

The seating section 156 of the sleeve 126 serves for accommodating a decoupling element 162 of the connecting device 106.

The decoupling element 162 is a resilient flexible element which, in particular, is formed from a rubber material or a plastic material for example.

Figure 8:
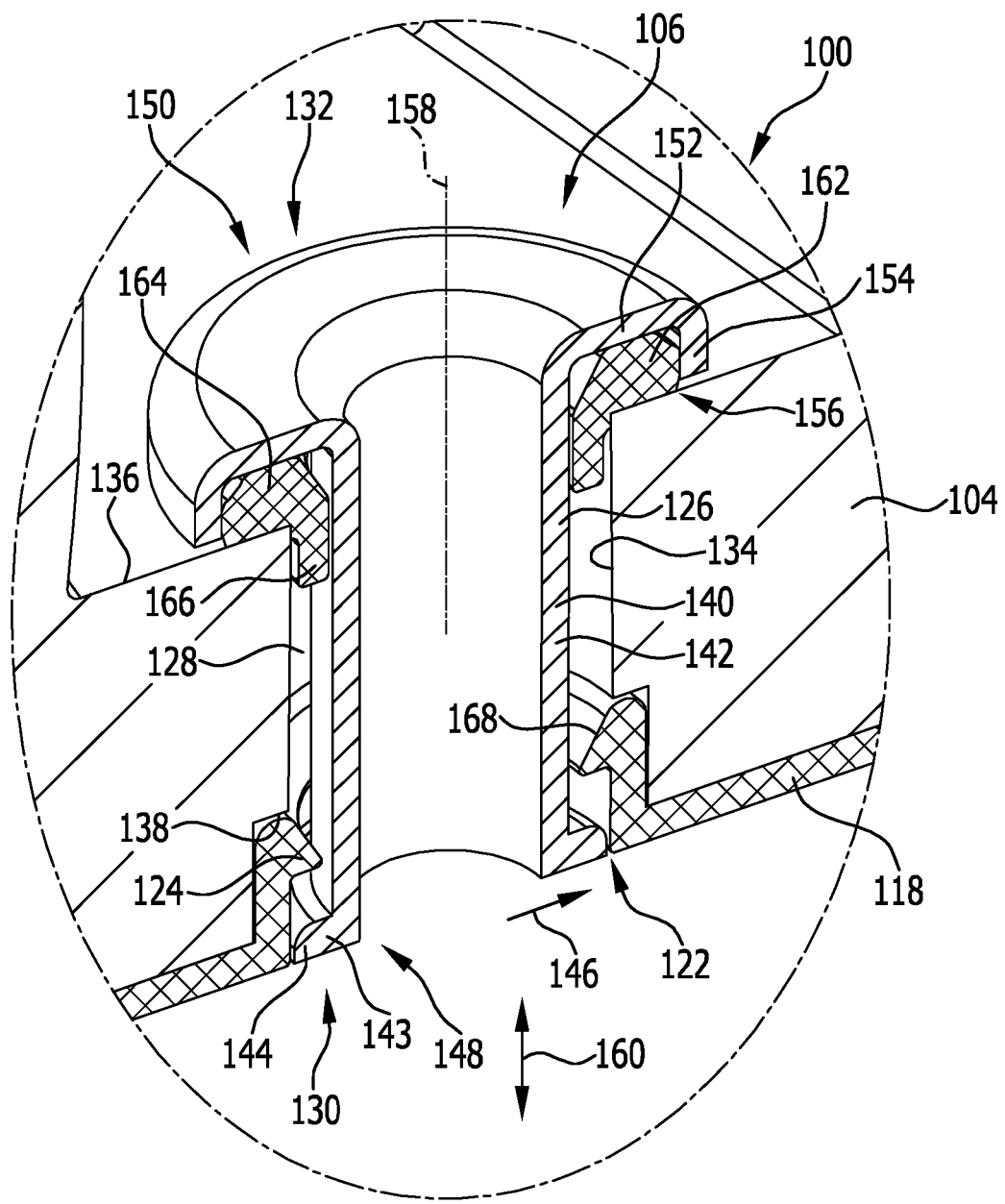
FIG. 8 an enlarged illustration of the region VIII in FIG. 7.

The decoupling element 162 is preferably substantially annular and comprises a base section 164 and also a centering protuberance 166 which projects in annular fashion from the base section 164 in the axial direction 160 (see in particular FIG. 8).

In the assembled state of the connecting device 106, the base section 164 of the decoupling element 162 is arranged outside the seating opening 128 and comes into contact especially with the outer surface 136 of the component 104 and also with the guidance section 142, the axially limiting section 152 and/or the radially outward limiting section 154 of the sleeve 126.

The centering protuberance 166 extends into the seating opening 128 and serves in particular for centering the sleeve 126 in the seating opening 128 in the assembled state of the connecting device 106.

For this purpose in particular, the centering protuberance 166 abuts the inner wall 134 of the seating opening 128 on the one hand and on the guidance section 142 of the sleeve 126 on the other.

Figure 5:
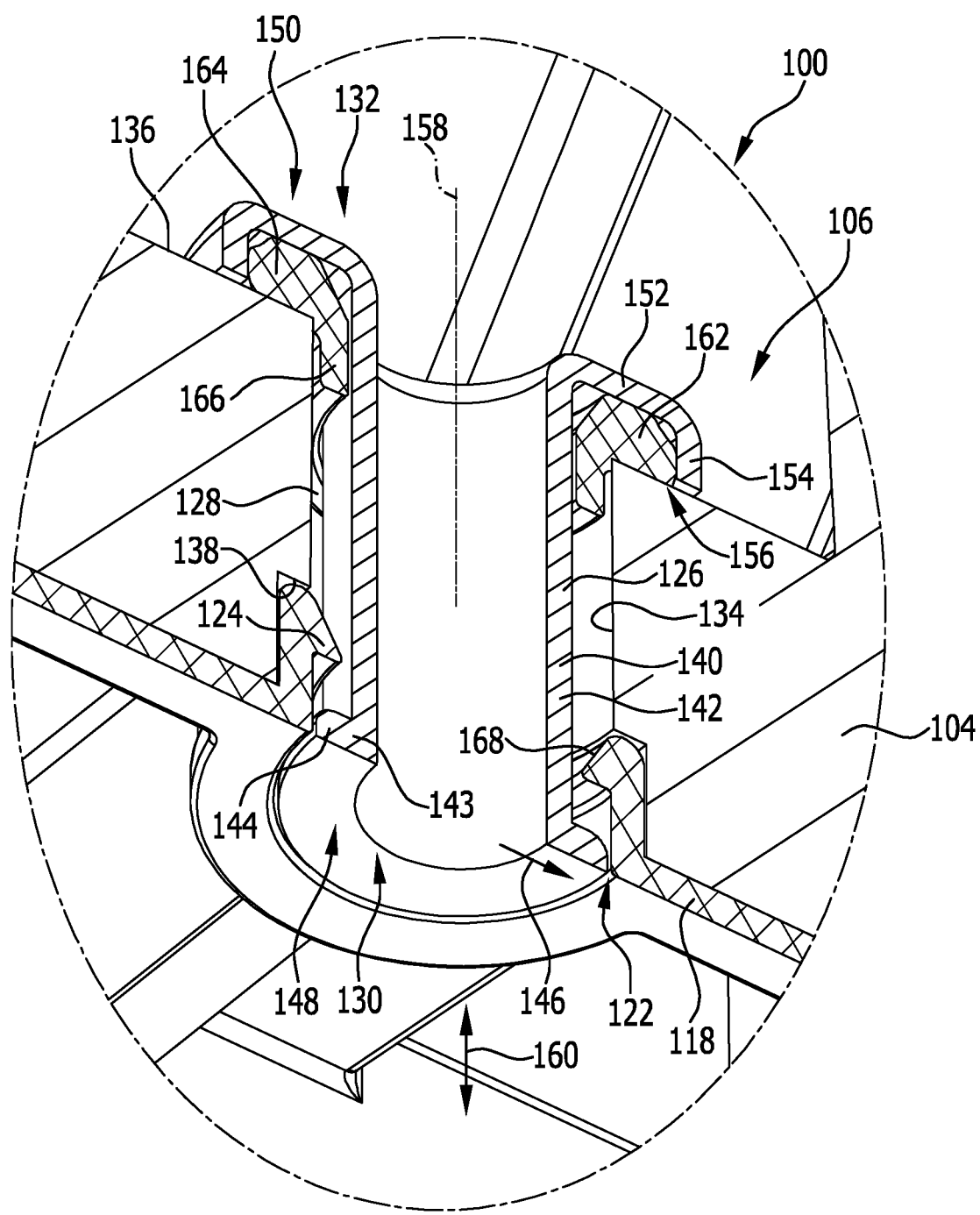
FIG. 5 an enlarged illustration of the region V in FIG. 4.
Figure 6:
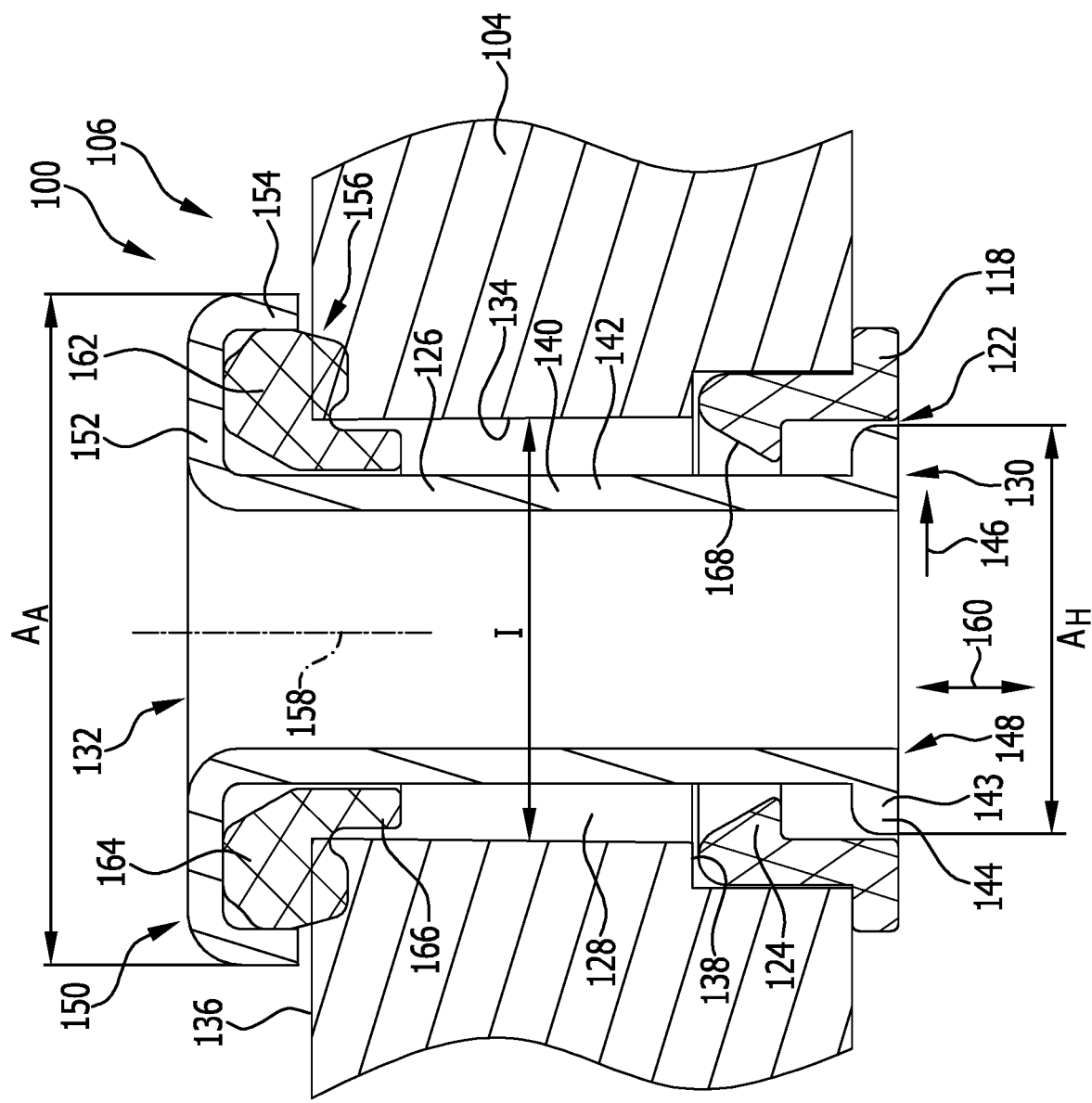
FIG. 6 a schematic section through a sleeve, a decoupling element and a gasket element of the connecting device depicted in FIG. 1.
Figure 7:
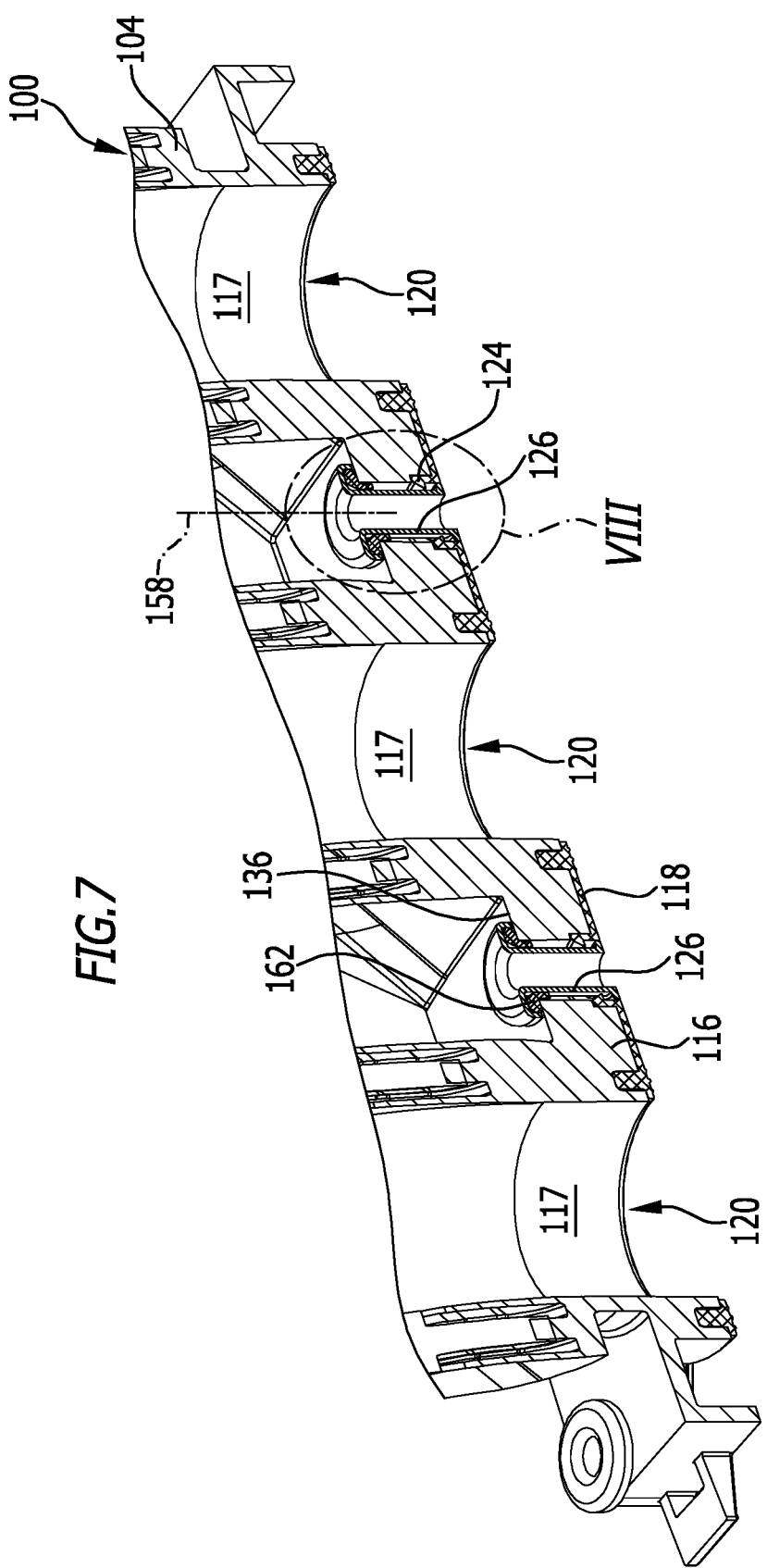
FIG. 7 a further perspective partly sectional view of the outlet section of the component including the connecting device depicted in FIG. 1 that is arranged thereon.

As can be derived in particular from FIGS. 5, 6 and 8, an outer diameter $A_A$ of the sleeve 126 in the region of the seating section 156 is larger than the inner diameter I of the seating opening 128.

In contrast thereto, an outer diameter AH of the sleeve 126 in the region of the sleeve foot 143 is at most of equal size as the inner diameter I of the seating opening 128.

The sleeve 126 can thus be pushed into the seating opening 128, namely by the sleeve foot 143, but it cannot be pushed through beyond the seating opening 128.

Rather, in the region of the seating section 156 and if necessary by means of the decoupling element 162, the sleeve 126 makes contact with the outer surface 136 of the component 104 which surrounds the seating opening 128 in the region of the assembly side 132.

The sleeve foot 143 of the sleeve 126 inserted into the seating opening 128 serves for fixing the gasket element 118 on the one hand and the sleeves 126 of the connecting device 106 on the other to the component 104.

For this purpose, the sleeve foot 143 is brought into engagement with the latching section 124 of the gasket element 118.

To this end, the latching section 124 comprises a beveled insertion face 168 so that the latching section 124 will be deformed in the radial direction 146 when the sleeve 126 is being pushed in and can then be gripped by the sleeve foot 143 in the axial direction 160.

In the assembled state of the entire component group 100, provision may be made for a bolt which is fed through the guidance section 142 of the sleeve 126 in particular.

The bolt serves to pull the components 104 together.

Hereby for example, a bolt head or a nut is effective on the axially limiting section 152 and presses the sleeve 126 into the seating opening 128 in the axial direction 160.

The decoupling element 162 thereby prevents the sleeve 126 from coming directly into contact with the component 104.

Hence, the bolt too does not come into direct contact with the component 104.

Rather, a connection between the components 104 is thus established exclusively via resilient components, namely in particular, the decoupling element 162 and the gasket element 118.

The transmission of unwanted vibrations between the components 104 can thereby be significantly reduced.

In particular, a substantial reduction in body noise can be realized.

Furthermore, due to the fact that the seating section 156 additionally comprises a radially outward limiting section 154, the decoupling element 162 can preferably be prevented from being deformed outwardly in the radial direction 146 whereby a decoupling effect and/or a stable connection of the components 104 to one another would be impaired.

The invention claimed is:

1. A connecting device for connecting two components comprising:
   a decoupling element; and
   a sleeve for accommodating and guiding a connecting element, wherein the sleeve is formed in one piece and comprises a base body which comprises the following:
      a hollow cylindrical guidance section in which a connecting element is guidable;
      an axially limiting section which projects outwardly away from the guidance section in a radial direction; and
      a radially outward limiting section which adjoins the axially limiting section and which together with the guidance section and the axially limiting section forms an annular seating section for accommodating the decoupling element;
   wherein the sleeve comprises a sleeve foot which is formed by an annular protuberance that projects outwardly away from the guidance section in the radial direction, and wherein the seating section for accommodating the decoupling element on the one hand and the sleeve foot on the other are arranged at mutually opposite ends of the sleeve with respect to an axial direction; and
   wherein the connecting device comprises a gasket element which incorporates one or more flow openings.

2. The connecting device in accordance with claim 1, wherein the radially outward limiting section runs at least approximately parallel to the guidance section.

3. The connecting device in accordance with claim 1, wherein the decoupling element is in the form of an annular resilient element.

4. The connecting device in accordance with claim 1, wherein the sleeve comprises a metallic material or is formed of a metallic material.

5. The connecting device in accordance with claim 1, wherein the base body of the sleeve comprises a metallic material or is formed of a metallic material.

6. A connecting device for connecting two components comprising:
   a decoupling element; and
   a sleeve for accommodating and guiding a connecting element, wherein the sleeve is formed in one piece and comprises a base body which comprises the following:
      a hollow cylindrical guidance section in which a connecting element is guidable;
      an axially limiting section which projects outwardly away from the guidance section in a radial direction; and
      a radially outward limiting section which adjoins the axially limiting section and which together with the guidance section and the axially limiting section forms an annular seating section for accommodating the decoupling element;
   wherein the sleeve comprises a sleeve foot which is formed by an annular protuberance that projects outwardly away from the guidance section in the radial direction, and wherein the seating section for accommodating the decoupling element on the one hand and the sleeve foot on the other are arranged at mutually opposite ends of the sleeve with respect to an axial direction; and
   wherein the connecting device comprises a gasket element which is adapted to be brought into engagement with the sleeve foot.

7. A component group comprising two components which are connected to one another or are connectable to one another by means of one or more connecting devices for connecting two components, the connecting device comprising:

a decoupling element; and
a sleeve for accommodating and guiding a connecting element, wherein the sleeve is formed in one piece and comprises a base body which comprises the following:
a hollow cylindrical guidance section in which a connecting element is guidable;
an axially limiting section which projects outwardly away from the guidance section in a radial direction; and
a radially outward limiting section which adjoins the axially limiting section and which together with the guidance section and the axially limiting section forms an annular seating section for accommodating the decoupling element;
wherein the sleeve comprises a sleeve foot which is formed by an annular protuberance that projects outwardly away from the guidance section in the radial direction, and wherein the seating section for accommodating the decoupling element on the one hand and the sleeve foot on the other are arranged at mutually opposite ends of the sleeve with respect to an axial direction; and
wherein one of the components comprises a seating opening for accommodating the sleeve, wherein the seating opening has an assembly side and a gasket side, wherein the assembly side is a side from which the sleeve is insertable into the seating opening, and wherein the gasket side is a side on which a gasket element of the connecting device is arranged for sealing between the components.

8. The component group in accordance with claim 7, wherein an inner diameter (I) of the seating opening corresponds at least approximately to an outer diameter (AH) of a sleeve foot of the sleeve or is larger than an outer diameter (AH) of the sleeve foot of the sleeve.

9. The component group in accordance with claim 7, wherein an inner diameter (I) of the seating opening is smaller than an outer diameter (AA) of the axially outer limiting section of the sleeve.

10. The component group in accordance with claim 7, wherein the seating opening is completely cylindrical at the assembly side thereof.

11. The component group in accordance with claim 7, wherein the seating opening adjoins an outer surface of the component substantially perpendicularly without a transition section.

12. A component group comprising two components which are connected to one another or are connectable to one another by means of one or more connecting devices for connecting two components, the connecting device comprising:
a decoupling element; and
a sleeve for accommodating and guiding a connecting element, wherein the sleeve is formed in one piece and comprises a base body which comprises the following:
a hollow cylindrical guidance section in which a connecting element is guidable;
an axially limiting section which projects outwardly away from the guidance section in a radial direction; and
a radially outward limiting section which adjoins the axially limiting section and which together with the guidance section and the axially limiting section forms an annular seating section for accommodating the decoupling element;
wherein the sleeve comprises a sleeve foot which is formed by an annular protuberance that projects outwardly away from the guidance section in the radial direction, and wherein the seating section for accommodating the decoupling element on the one hand and the sleeve foot on the other are arranged at mutually opposite ends of the sleeve with respect to an axial direction; and
wherein the component group comprises one or more flow channels which enable fluid to flow from one component into the other component, wherein a gasket element of the connecting device is provided for the purposes of sealing the one or more flow channels with respect to the environment of the component group, and wherein said gasket element surrounds the one or more flow channels in annular fashion.

13. The component group in accordance with claim 12, wherein the gasket element is formed in one-piece.

14. The component group in accordance with claim 12, wherein the gasket element is fixable in a positively-locking manner to one of the components by means of one or more sleeves of one or more connecting devices.

15. A component group comprising two components which are connected to one another or are connectable to one another by means of one or more connecting devices for connecting two components, the connecting device comprising:
a decoupling element; and
a sleeve for accommodating and guiding a connecting element, wherein the sleeve is formed in one piece and comprises a base body which comprises the following:
a hollow cylindrical guidance section in which a connecting element is guidable;
an axially limiting section which projects outwardly away from the guidance section in a radial direction; and
a radially outward limiting section which adjoins the axially limiting section and which together with the guidance section and the axially limiting section forms an annular seating section for accommodating the decoupling element;
wherein the sleeve comprises a sleeve foot which is formed by an annular protuberance that projects outwardly away from the guidance section in the radial direction, and wherein the seating section for accommodating the decoupling element on the one hand and the sleeve foot on the other are arranged at mutually opposite ends of the sleeve with respect to an axial direction; and
wherein the component group comprises a component which is in the form of an inlet manifold of an internal combustion engine and comprises one or more seating openings for one or more sleeves of one or more connecting devices.

* * * * *